United States Patent [19]
Saunders

[11] 3,907,590
[45] Sept. 23, 1975

[54] ALUMINUM ELECTRODE
[75] Inventor: Richard C. Saunders, Simi, Calif.
[73] Assignee: Rockwell International Corporation, El Segundo, Calif.
[22] Filed: July 5, 1974
[21] Appl. No.: 485,853

[52] U.S. Cl.............. 136/6 LF; 136/20; 136/100 R
[51] Int. Cl.......................................... H01m 35/02
[58] Field of Search........... 136/6 F, 6 LF, 6 FS, 20, 136/83 R, 100 R, 120 R

[56] References Cited
UNITED STATES PATENTS
| | | | |
|---|---|---|---|
| 3,445,288 | 5/1969 | Buzzelli | 136/6 LF |
| 3,501,349 | 3/1970 | Benak | 136/20 |
| 3,607,404 | 9/1971 | Buzzelli | 136/6 LF |
| 3,639,174 | 2/1972 | Kegelman | 136/20 |

Primary Examiner—Anthony Skapars
Attorney, Agent, or Firm—L. L. Humphries; H. Kolin; C. E. DeLarvin

[57] ABSTRACT

An improved electrode structure for a rechargeable battery containing a solid aluminum or aluminum-lithium alloy electrode as the anode, a sulfur-containing cathode, and a molten salt electrolyte. The improved aluminum electrode structure has a plurality of electrical conductors disposed therein to provide electrical contact and structural support. At least one of the conductors extends beyond the anode and is attached to the inside of the battery case in a manner which allows for a predetermined amount of movement of the anode during repeated charging and discharging of the battery.

10 Claims, 3 Drawing Figures

ALUMINUM ELECTRODE

BACKGROUND OF INVENTION
1. Field of the Invention

The present invention relates to electrodes for use in a rechargeable electrical energy storage device (generally referred to as a secondary or rechargeable battery) which conventionally includes an electrolyte in contact with the electrodes. More particularly, the invention relates to a rechargeable battery which utilizes a molten salt electrolyte containing at least one lithium halide, an aluminum alloy anode and a sulfur-containing cathode.
2. Prior Art The problem of air pollution in urban areas attributed to emissions from motor vehicles using internal combustion engines is of increasing concern. Because battery-powered vehicles themselves produce no exhaust or unburned fuel emission, they are particularly attractive for urban use. However, to develop practical electrical automobiles for general use, low-cost secondary batteries having sufficient high-energy density and high-power density are required. Liquid lithium metal has been extensively utilized in some high-power density molten salt batteries, e.g., $Li/Cl_2$, $Li/S$, $Li/Se$, and $Li/Te$. The lithium-sulfur cell using molten halide electrolytes is of particular interest. See M. L. Kyle et al, "Lithium/Sulfur Batteries for Electric Vehicle Propulsion", 1971 *Sixth Intersociety Energy Conversion Engineering Conference Proceedings*, p 38; L. A. Heredy et al, *Proc. Intern. Electric Vehicle Symp.*, Electric Vehicle Council 1, 375 (1969). However, it has been found that high self-discharge rates due to corrosion of cell components by liquid lithium coupled with some appreciable solubility of liquid lithium in the molten salt electrolytes often cause difficulties in material selection and battery cell design. Such difficulties can be avoided by use of a solid alloy of lithium as a source of lithium in an electrochemical cell. One such alloy is the aluminum-lithium alloy which has been utilized as the solid negative electrode. Excellent electrochemical performance of aluminum-lithium alloy in a composition range of 5–30 wt.% lithium in a molten salt electrolyte has been reported. See N. P. Yao et al, "Emf Measurements of Electrochemically Prepared Lithium-Aluminum Alloy", *J. Electrochem. Soc.* 118, 1039–1042 (July 1971) and references cited therein.

In U.S. Pat. No. 3,445,288 to E. S. Buzzelli, "Aluminum Anode Electrical Energy Storage Device", it is proposed to prepare an aluminum-lithium electrode by preparing a preformed alloy of aluminum and lithium. Alternatively, it is proposed to prepare the electrode electrochemically by charging a substantially pure aluminum electrode in a molten salt electrolyte containing lithium ions so as to diffuse lithium into the aluminum electode structure. As described in this patent, the electrode expands as the lithium enters its structure on charge, and contracts as the lithium leaves its structure on discharge. To have the electrode stand the stresses of expansion and contraction, the aluminum-lithium electrode is preconditioned prior to use. This preconditioning consists of slow charging and discharging before regular use.

None of the proposed prior art molten salt electrolyte batteries has proven totally satisfactory. There still is a need, therefore, for further improvement in such batteries.

It has been further found by the present inventor that in such a molten salt battery using an alloy of aluminum and lithium as the anode, upon continued cycling of the battery (charging-discharging) the anode undergoes a continuous physical and chemical change. After about 10 to 20 cycles, the anode has undergone such a change in crystal structure that it becomes mechanically unsound. More particularly, the anode becomes increasingly porous and brittle with continued use resulting in gradual disintegration of the anode. The increase in porosity results in a decrease in electrical conductivity of the anode with a corresponding decrease in efficiency. It further has been found that as the cycling of the battery is continued, the anode actually begins to break up into pieces or particles which are circulated through the battery electrolyte by the convection currents that exist therein. The electrical energy storage capability of a battery is directly related to the mass and composition of the electrodes; thus, a loss of even a part of the anode results in a decrease in the specific energy storage capability of the battery.

SUMMARY

Broadly, the present invention provides a method of overcoming the know problems present in the prior art and further of increasing the life of molten electrolyte batteries having an aluminum-lithium alloy as the anode by providing by means of minimizing or substantially postponing the occurrence of both such undesirable phenomena first recognized by the present inventor, namely, decrease of anode electroconductivity and of specific energy storage capacity of the battery.

In accordance with one embodiment of the invention there is provided a method of structurally supporting and providing electrical contact to an aluminum-lithium-alloy anode located in a rechargeable battery of the type which utilizes a molten salt electrolyte and a sulfur-containing electrode. The method includes (a) providing an attachment means in the battery, the attachment means providing a path of electrical communication to a terminal point on the outside of the battery; (b) providing a plurality of elongated, ductile electrical conductors through the anode, at least one of the electrical conductors having an end extending beyond the anode; (c) bending the extending end of the electrical conductor in such a manner as to describe a non-linear or serpentine path between the anode and the attachment means, and attaching the end to the attachment means.

The purpose of bending the extending end of the conductor is to allow for subsequent movement of the electrical conductor, within predetermined limits, to compensate for changes in size of the anode upon charging and discharging of the battery. The plurality of wires provided through the anode insure uniform conductivity and electrical contact with the anode. Further, they also provide structural support for the anode, thus, extending its life considerably.

In accordance with another embodiment of the invention there is provided an improved rechargeable battery. The rechargeable battery includes a molten salt electrolyte in contact with an aluminum-lithium alloy anode and a sulfur-containing cathode. The improvement comprises (a) an attachment means located within the battery to provide electrical communication to a terminal external to the battery and (b) a plurality of elongated, ductile electrical conductors extending through the anode, at least one of the conductors having an end extending beyond the anode, which is connected to the attachment means. The portion of the electrical conductor intermediate the attachment means and the anode describes a serpentine path to allow for subsequent movement of the anode, within predetermined limits, upon charging and discharging of the battery. Preferably such conductor has extending ends which are connected to the attachment means in the manner just described.

DETAILED DESCRIPTION

Figure 1:
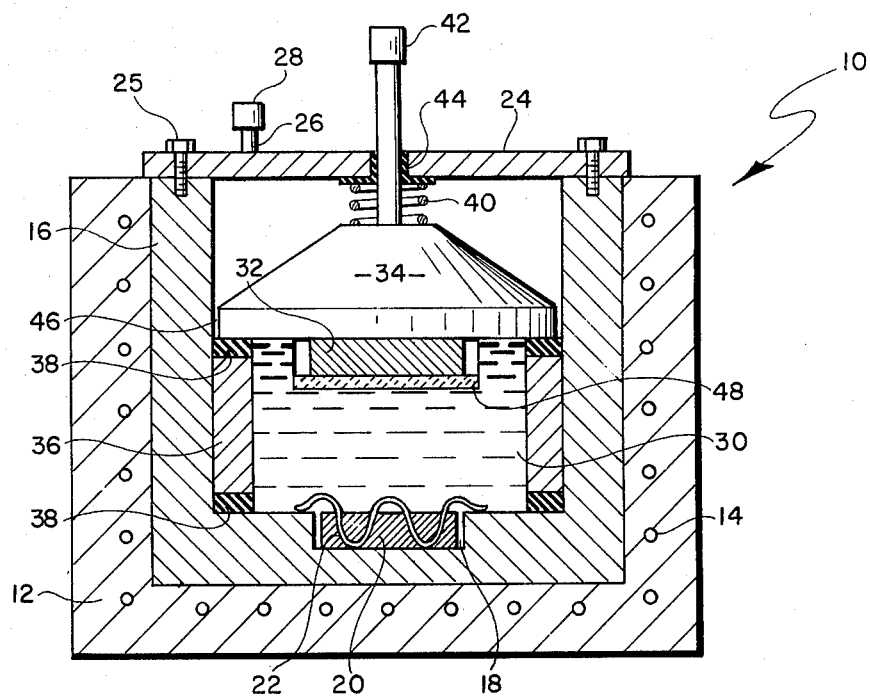
FIG. 1 is a cross sectional view of a battery incorporating the improved anode of the present invention.

The present invention relates to rechargeable batteries of the type using a molten salt electrolyte, a sulfur-containing cathode and an aluminum-lithium anode. The term "molten salt electrolyte" as used herein refers to a lithium halide containing salt which is maintained at a temperature above its melting point. The molten salt may be either a single lithium halide, a mixture of lithium halides or a eutectic mixture of one or more lithium halides, and other alkali metal or alkaline earth metal halides.

Typical examples of binary eutectic salts are lithium chloride-potassium chloride, lithium chloride-magnesium chloride, lithium chloride-sodium chloride, lithium bromide-potassium bromide, lithium fluoride-rubidium fluoride, lithium iodide-potassium iodide and mixtures thereof. Two preferred binary salt eutectic mixtures are those of LiCl and KCL (m.p. 325°C) and LiBr and RbBr (m.p. 278°C).

Examples of ternary eutectics useful as the molten salt electrolyte include calcium chloride-lithium chloride-potassium chloride, lithium chloride-potassium chloride-sodium chloride, calcium chloride-lithium chloride-sodium chloride, and lithium bromide-sodium bromide-lithium chloride. Preferred ternary eutectic mixtures include those containing LiF, LiCL and LiI (m.p. 341°C) and LiCl, LiI and KI (m.p. 260°C).

The suitable alkali or alkaline earth metal ion should have a deposition potential very close to or preferably exceeding the deposition of lithium ion in the electrolyte. Thus lithium halide salts can be readily combined with halides of potassium, barium and strontium. Halides of metals such as cesium, rubidium, calcium or sodium may be used, but a substantial proportion of these metals may be co-deposited with the lithium when the electrode is charged with a resulting small loss in potential.

Although the ternary eutectic salt mixtures, particularly those containing the iodides, provide lower melting points, the binary eutectic mixture of LiCl—KCl sometimes is preferred on the basis of its cost and availability, particularly for batteries to be used in large-scale applications such as electric powered vehicles and electric utility bulk energy storage.

The cathode of the rechargeable battery contains sulfur. The cathode may be essentially pure sulfur or it may be graphite impregnated with sulfur. Alternatively, the cathode may comprise a metal sulfide or a mixture of metal sulfides. A preferred cathode is one comprising a copper or iron sulfide or mixtures thereof.

The anode is a lithium-aluminum alloy which may be formed in situ by coulometrically charging lithium into a substantially pure aluminum electrode. In accordance with the present invention, it is a critical and essential feature that the molten salt electrolyte in which the in situ preparation of the aluminum-lithium alloy electrode takes place contains iodide ions in addition to lithium ions. Other halide anions as well as alkali metal or alkaline earth metal cations may also be present. The preconditioning of the aluminum-lithium alloy electrode takes place independently of whether the same molten salt is subsequently used as the electrolyte in a high-energy cell. Thus molten salts can be used for the preconditioning even though such salts would be undesirable for use in an operating sulfur or other counterelectrode cell, for example, because of their relatively high melting points or cost. Suitably, lithium iodide may be used per se (m.p. 449°C) to provide both lithium and iodide ions. Alternatively, any lithium halide salt, including lithium iodide, may be used in combination with one or more of the following iodide salts as electrolyte components: KI (m.p. 685°C), NaI (m.p. 662°C), $MgI_2$ (m.p. 650°C), and $CaI_2$ (m.p. 784°C). Some of these iodides form low-melting binary eutectic mixtures which may be used as electrolyte components provided lithium cations are also present: LiI—KI (60 mol % LiI, m.p. 260°C), KI—$MgI_2$ (60 mol % KI, m.p. 255°C), NaI—$MgI_2$ (60 mol % NaI, m.p. 430° C). Because of their low melting points and high lithium-ion concentration, the following ternary eutectic mixtures are particularly preferred both for use as salts in which the electrodes are prepared as well as for use a molten salt electrolytes in high-energy cells having an Li—Al electrode and in which the counterelectrode is sulfur or a metal sulfide. These preferred electrolytes comprise the eutectic mixtures of LiI—LiCl—KI (59.0-8.5-32.5 mol %, m.p. 264°C) and LiI—LiCl—LiF (59.2-29.1-11.7 mol %, m.p. 341°C).

The aluminum-lithium alloy electrode in its formed state comprises aluminum in amounts of about 70–95 wt.% based on total composition and lithium in amounts of about 5–30 wt.% based on total composition. Impurities such as, for example, copper, magnesium, manganese, indium and iron may be present in quantities of less than about 10 wt.%.

It is an essential feature of the present invention that there be provided a plurality of elongated ductile electrical conductors extending through the anode. Generally, there will be provided at least four electrical conductors and preferably a sufficient number of overlapping conductors to form a screen having a mesh size (U.S. National Bureau of Standards wire cloth sieve size) of from about 4 to 14 mesh. Particularly good results and long battery life have been obtained when the conductors were present in a sufficient number to form a screen having a mesh size of 4 to 8 mesh.

Generally the electrical conductor will be in the form of wire having a substantially circular cross section. Obviously, however, it is not essential that the conductors have a circular cross section and they may be other shapes such as elliptical, square, rectangular, and the like. The size of electrical conductor selected may vary, of course, depending upon the size of the anode and the number and shape of the conductors utilized. Generally the electrical conductors will have a cross sectional area of from about $3 \times 10^{-5}$ to $3 \times 10^{-4}$ in$^2$ and preferably about $1.5 \times 10^{-4}$ in$^2$ when the electrical conductor is a wire.

The ductile electrical conductor must have sufficient rigidity to provide mechanical support for the anode and still have sufficient flexibility to permit a predetermined amount of movement of the anode upon repeated charging and discharging of the battery.

Proper ductility if provided by utilizing metals having a yield strength of at least about 30,000 psi and a tensile strength of at least about 125 percent of the yield strength. Suitable materials include tantalum, steel and steel alloys, such as, for example, stainless steels. A particularly preferred group of materials are the martensitic stainless steels generally referred to as the 400 series stainless steels.

Referring now to the drawings, in FIG. 1 there is depicted in cross section a rechargeable battery incorporating an anode formed in accordance with the present invention. The rechargeable battery designated generally by the reference numeral 10, includes an outer housing 12 which is provided with heating means such as plurality of resistance heating wires 14. The rechargeable battery has a cell liner 16, and a cover 24 which are a conductive material, preferably stainless steel. Liner 16 is provided with a recess 18 to receive the anode 20. Recess 18 advantageously is made larger than anode 20 to allow for subsequent expansion and retraction of the anode during charging and discharging. Extending through anode 20 is one of a plurality of electrical conductors 22 which is attached to the steel liner whereby the liner provides electrical communication to cell cover 24. Cover 24 is secured to cell liner 16 by a plurality of threaded fasteners 25. Cover 24 also is provided with a metal stud 26 which has attached thereto an electrical connector 28, whereby electrical connector 28 is in electrical communication with anode 20.

Contained within battery 10 is a molten salt electrolyte 30 which is in contact with anode 20 and a sulfur-containing cathode 32. The sulfur containing cathode is held by a cathode holder 34, and maintained in a spaced relation to anode 20 by spacer 36 and seals 38. Cathode holder 34, which preferably is a dense graphite, is maintained in contact with spacer 36 and seals 38 by biasing means 40 which may be, for example, a coil spring. Cathode holder 34 has a portion extending through cell cover 24 and terminating in an electrical connector 42. Spring 40 and the extending portion of cathode holder 34 are maintained out of electrical contact with cell cover 24 by insulator 44. The sides of cathode holder 34 are maintained out of electrical contact with cell liner 16 by an air gap 46. An insulator could be used in lieu of an air gap if desired.

In some instances it may be desirable to provide a separator 48 to retain cathode 32 in position. In such instances the separator advantageously is a porous ceramic such as an oxide of silicon, magnesium, zirconium, beryllium or combinations thereof. The separator should have a median pore size of from 10 to 100 microns and a porosity of from about 10 to 80%.

Figure 2:
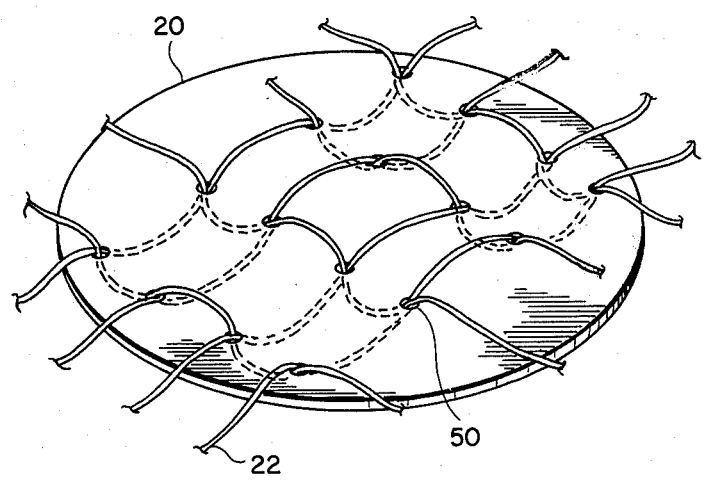
FIG. 2 is a pictorial view of an anode formed in accordance with an embodiment of the present invention.

Referring now to FIG. 2 therein is depicted an enlarged pictorial view of anode 20 which is in the form of a substantially cylindrical wafer and provided with a plurality of apertures 50 therethrough. Passing through the apertures in serpentine and overlapping paths are a plurality of electrical conductors 22. In accordance with a preferred embodiment of the invention, each of the conductors has opposite ends extending beyond anode 20. Upon installation in a battery such as, for example, the one depicted in FIG. 1, each of the extending ends is welded to cell liner 16 which comprises the attachment means which provides electrical communication to a point exterior to the battery. Advantageously, after installation, or before, a sufficient uniform force is applied to anode 20 to cause physical deformation of the anode, thereby insuring mechanical contact of the anode with electrical conductors 22 substantially throughout their length.

Figure 3:
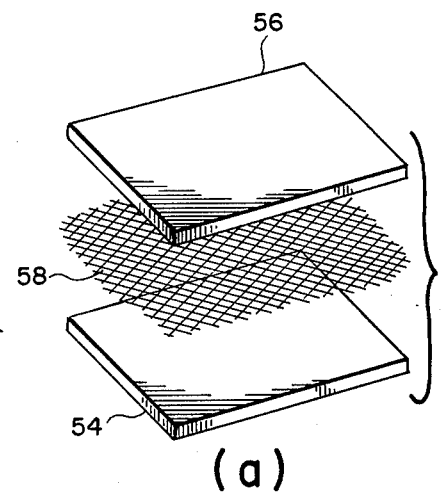
FIG. 3 is a pictorial view of an anode formed in accordance with another embodiment of the present invention.
Figure 3:
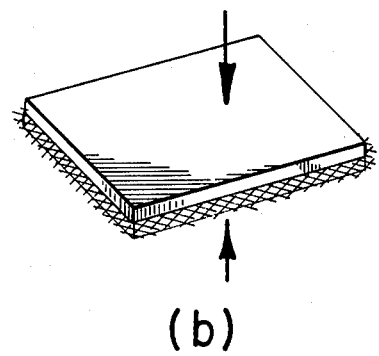

In FIG. 3(a) and (b) there is depicted another embodiment of the invention. Two aluminum plates 54 and 56 of a desired size are obtained, and in between the two plates there is placed a plurality of electrical conductors in the form of a wire screen 58 (FIG. 3a). Pressure is applied to each side of the two plates in the direction designated by the arrows (FIG. 3b), whereby the aluminum plates are caused to cold flow around the wire and become mechanically bonded to each other.

The following example is set forth for the sole purpose of demonstrating the efficacy of a preferred embodiment of the present invention, and should not be construed as limiting the scope thereof.

EXAMPLE

More particularly, a battery, substantially the same as that depicted in FIG. 1, is provided with an aluminum disc having a thickness of about 0.050 inch and a diameter of about 1.25 inches. Eight current collectors comprising stainless steel wires (0.010 inch diameter) are woven through pre-drilled holes in the disc to provide a screen-like pattern in the manner shown in FIG. 2. The disc is placed in recess 18 of the battery, and the extending ends of the wires are welded to cell liner 16. The cathode comprises a dense graphite holder having a cavity which is filled with elemental sulfur as the active cathode material. The electrolyte 30 comprises a lithium iodide-potassium iodide-lithium chloride ternary eutectic having a melting point of about 264°C.

The lithium-aluminum alloy anode is prepared in situ by electrochemically charging lithium into the aluminum in an amount sufficient to provide an anode comprising about 20.6% by weight lithium. The initial current density used during charging of lithium into the aluminum disc is about 50 ma/cm$^2$. The current density is gradually increased to about 200 ma/cm$^2$. The fully charged anode then can be discharged and charged at a current density of about 200 ma/cm$^2$ without significant polarization occurring.

The cell is operated at temperatures between about 300° and 340°C under various load conditions and current densities for over 115 cycles with substantially no significant decrease in the performance of the battery.

When it is attempted to repeat the foregoing procedure in accordance with the prior art technique, viz., using current collectors comprising eight wires extending only from cell liner 16 to the surface of the aluminum disc, a substantial decrease in battery performance is observed after less than about 25 cycles. Upon disassembly of the battery it is found that several of the current collectors are in loose contact with the anode structure. Further, the aluminum-lithium alloy anode shows signs of significant structural deterioration. Clearly, this example demonstrates the benefits obtainable with the present invention.

The foregoing example and description are for purposes of illustration only and should not be construed as limiting the scope of the present invention, as various modifications and embodiments will be apparent to those versed in the art.

What is claimed is:

1. In a rechargeable battery containing a molten salt electrolyte, an aluminum-alloy anode and a sulfur-containing cathode, the improvement comprising
   an attachment means located in the battery to provide electrical communication to a terminal external to the battery and a plurality of elongated ductile electrical conductors extending through the anode, at least one of the conductors having an end portion extending beyond the anode and attached to said attachment means, said end portion describing a serpentine path intermediate the anode and said attachment means.

2. The battery of claim 1 wherein the electrical conductors are stainless steel wire.

3. The battery of claim 1 wherein there are provided at least four elongated electrical conductors.

4. The battery of claim 1 wherein each conductor has an extending end and each extending end is attached to said attachment means.

5. The battery of claim 1 wherein a part of the plurality of conductors overlap the other part at substantially 90° angles to form a screen.

6. A method of structurally supporting and providing electrical contact throughout an aluminum alloy anode located in a rechargeable battery of the type which utilizes a molten salt electrolyte and a sulfur-containing cathode comprising
   a. providing an attachment means in the battery, said attachment means providing a path of electrical communication to a terminal external to the battery;
   b. providing a plurality of elongated, ductile electrical conductors, said electrical conductors passing through the anode, and at least one of the electrical conductors having an end extending beyond the anode; and
   c. bending the extending end of the elongated ductile electrical conductor to describe a non-linear path between the anode and said attachment means, and attaching the extending end to said attachment means; whereby there is provided structural support for an electrical contact throughout the anode, and a movable electrical contact is provided between the anode and said attachment means.

7. The method of claim 6 wherein said elongated ductile electrical conductors are stainless steel wires.

8. The method of claim 6 wherein there are provided at least four elongated ductile electrical conductors.

9. The method of claim 6 wherein each of said elongated ductile electrical conductors has an extending end and each extending end is attached to said attachment means.

10. The method of claim 6 wherein a part of said plurality of elongated ductile electrical conductors overlap the other part at substantially 90° angles to form a screen.

* * * * *

UNITED STATES PATENT AND TRADEMARK OFFICE
CERTIFICATE OF CORRECTION

PATENT NO. : 3,907,590
DATED : Sept. 23, 1975
INVENTOR(S) : Richard C. Saunders

It is certified that error appears in the above-identified patent and that said Letters Patent are hereby corrected as shown below:

Column 1, lines 2 and 3, "1. Field of the Invention" should be on a separate line as a sub-heading under "BACKGROUND OF INVENTION"; line 13, "2. Prior Art" should be on a separate line as a sub-heading.

Column 2, line 25, "know" should read --known--.

Column 3, line 24, "lithium" should read --alloy--; line 38, "325°C" should read --352°C--; line 50, after "deposition" insert --potential--.

Column 4, line 35, "a" should read --as--.

Signed and Sealed this eighteenth Day of May 1976

[SEAL]

Attest:

RUTH C. MASON
Attesting Officer

C. MARSHALL DANN
Commissioner of Patents and Trademarks